Nov. 14, 1950   T. B. KIMBALL ET AL   2,529,503
CRACKING APPARATUS
Filed May 14, 1947   2 Sheets-Sheet 2
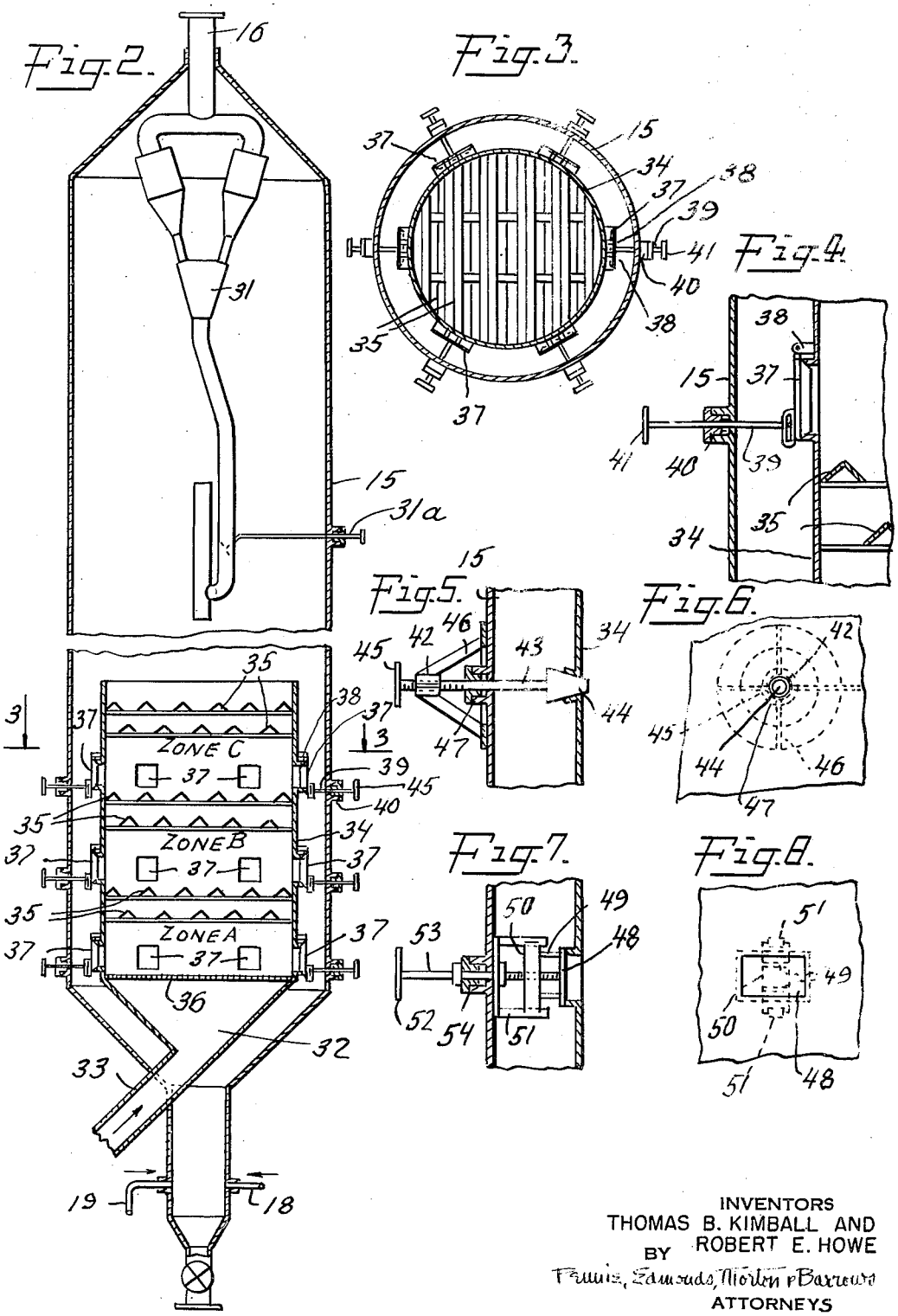
INVENTORS
THOMAS B. KIMBALL AND
ROBERT E. HOWE
BY
ATTORNEYS Patented Nov. 14, 1950

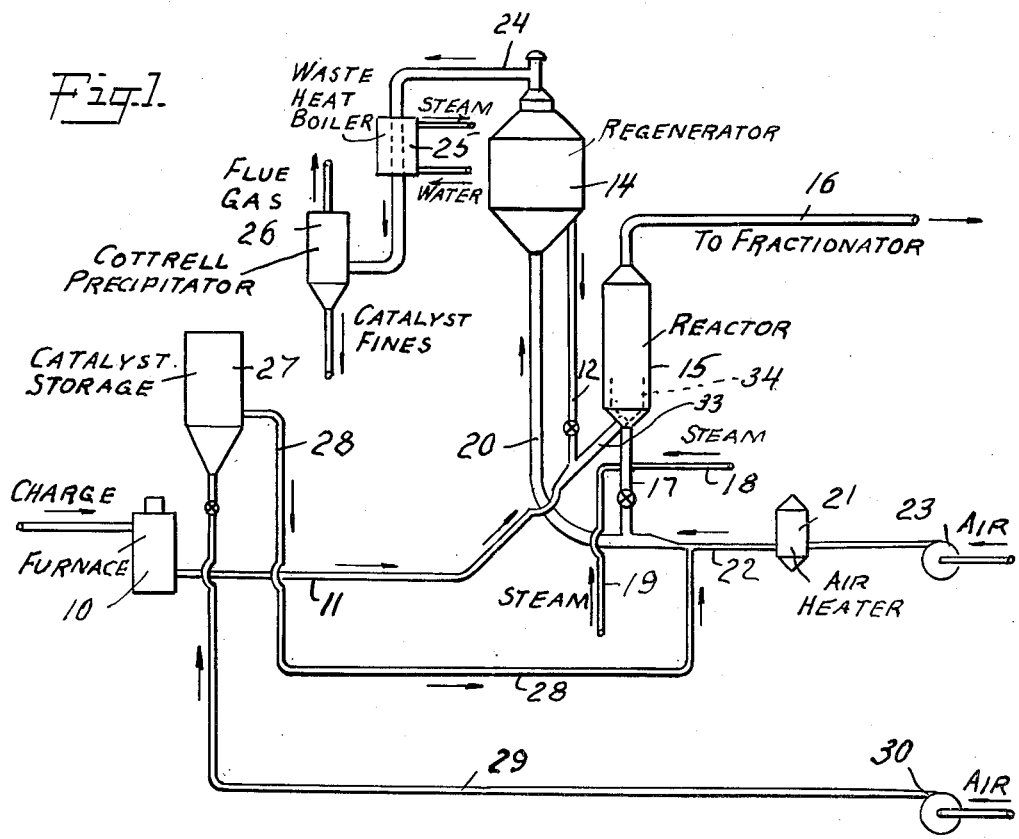

2,529,503

UNITED STATES PATENT OFFICE 2,529,503

CRACKING APPARATUS

Thomas B. Kimball, Greenwich, Conn., and Robert E. Howe, Sinclair, Wyo., assignors to Sinclair Refining Company, New York, N. Y., a corporation of Maine Application May 14, 1947, Serial No. 748,052

4 Claims. (Cl. 23—288)

Our invention deals with fluid catalytic cracking and more particularly to improvements in fluid catalytic cracking reactors.

In the systems to which our invention relates the catalyst, conventionally a natural silicate or a silica-alumina synthetic, is in finely powdered form and by aeration is maintained continuously in a free flowing condition. Circulation of the catalyst is achieved by utilization of the gas lift principle, that is by balancing a down-flowing stream of high solids density against an up-flowing stream of low solids density.

Such systems comprise, in addition to the vessel in which the catalyzed cracking reaction takes place, a separate vessel for regeneration of the catalyst by the burning off of coke deposited thereon as an incident of the cracking reaction and various auxiliary equipment. Our invention, as above indicated, is specifically directed to the reactor but the effects are reflected in the improved operation of the system as an entity.

In the operation of the conventional reactor the oil to be cracked enters the reactor as a vapor with the powdered catalyst dispersed therein through a pipe, usually diagonally disposed, terminating in a funnel shaped portion capped with a grid which serves primarily to prevent the entry of any chunks or fragments of agglomerated catalyst from the upper reaches of the reactor chamber but which may also perform a mixing or distributing function. Spent catalyst collects below the flared portion of the feed pipe and before being passed to the regenerator by a current of hot air is steamed to remove volatiles, the area of the steaming being referred to as the "stripping" zone.

Under the described arrangement, it is theoretically possible for fresh catalyst after being carried into the reactor to immediately drop into the stripping zone before it has had a chance to do its work and actual occurrence of this undesideratum is indicated by the operating results.

Our invention, which will be made clear from the accompanying drawings illustrating a preferred apparatus for practicing it, besides largely obviating the possibility of loss of catalyst values from premature deposition of freshly charged catalyst in the stripping zone materially increases the efficiency of the steam stripping operation. It also provides for more effective utilization of any given amount of catalyst in the reactor since it eliminates steam from the cracking section and thus allows for better contact between the oil vapors and catalyst. Additionally, the invention, by eliminating steam from the cracking section, gives increased catalyst life. It has been realized that the life of the finely divided catalyst is materially shortened through contact with steam arising from the stripping zone, but to our knowledge no practical scheme has heretofore been devised which prevents the contact.

With regard to the drawings, Figure 1 is a simplified flow diagram illustrative of a fluid catalytic cracking system as a whole, this figure serving to set the environment of our invention. Figure 2 is a broken sectional elevation of a reactor equipped according to the invention. Figure 3 is a section on line 3—3 of Figure 2, and Figures 4-8, inclusive are detailed views of catalyst level controlling means to be hereinafter described.

Referring first to Figure 1, the oil to be cracked, normally gas oil, is introduced into a furnace 10 wherein it is heated to a predetermined temperature before being passed via line 11 in company with catalyst, charged to the oil stream from valve controlled standpipe 12 depending from regenerator 14, into reactor 15. Cracked products are conveyed from the reactor 15 to a fractionator, not shown, via line 16, while spent catalyst is withdrawn from the bottom of the reactor through valve controlled pipe 17 after being treated with steam admitted via lines 18 and 19, the steam serving to strip the catalyst of volatile hydrocarbons which with the steam leave the reactor in the company of the cracked products. The discharged spent catalyst is carried into the regenerator 14 via pipe 20 by hot air from air heater 21 connected with pipe 20 through line 22 and fed by compressor 23, the air being heated to a temperature sufficiently high to burn off the carbonaceous matter deposited on the catalyst during the cracking reaction. Flue gas from the regenerator 14 is conveyed via pipe 24, passing through waste heat boiler 25, to a Cottrell precipitator 26 which serves to separate entrained catalyst. The separated catalyst may be returned to the regenerator, passed to catalyst storage or otherwise disposed of. Fresh catalyst is introduced into the system as required from hopper 27 via line 28 connecting with line 22 joining air heater 21 and the regenerator standpipe 20, the fresh catalyst being carried in a stream of air admitted to the hopper from line 29 extending from compressor 30.

In many operations, the furnace 10 is needed only for start-up, more than sufficient heat being recovered from the catalyst regeneration for the pre-vaporization of the oil charge. Heat liberated in the regenerator in excess of vaporizing and cracking requirements is readily removed by circulating a stream of catalyst, withdrawn from standpipe 12 associated with the regenerator 14, through a suitable boiler.

The operating temperature and other conditions, of course, vary depending upon the charge stock and the products desired. In the production of motor fuels of improved quality from gas oil charge stocks the temperature of the oil vapor and catalyst ranges from about 800°–975° F., while the temperature at which the carbon is burned off the catalyst in the regenerator is of the order of from 1000°–1150° F.

As is well understood in the art, the operation of fluid catalytic cracking systems can be rendered entirely automatic. The ratio of catalyst flow to oil flow may be controlled by a mechanism which is actuated by changes in the density of the catalyst-oil mixture, the flow of catalyst to the regenerator by the level of the spent catalyst above the valve in the reactor catalyst discharge pipe, i. e. pipe 17 in the drawings.

Referring now particularly to Figures 2 and 3, which omit parts unnecessary to an understanding of our invention, the reactor as improved according to the invention will be seen as comprising, in addition to the usual cyclone separator 31, controlled through damper 31a, for removing catalyst from the cracked products and the usual funnel shaped element 32, integral with or attached to the catalyst-oil charge pipe 33, a skirt 34 extending upwardly from the funnel shaped element 32 and spaced from the reactor casing, the area enveloped by the skirt being divided into zones by baffles 35 which promote mixing of the oil vapor and catalyst additional to that owing to the presence of a grid 36 covering the mouth of funnel element 32 and incident to the charging of the two materials together. Although Figure 2 shows three zones, legended "A," "B," and "C," it will be understood that a greater or lesser number of zones may be provided.

For catalyst depth control, there is associated with skirt 34, immediately above grid element 36 and above each series of transverse baffles 35, trap doors 37 covering correspondingly shaped openings or windows in the skirt, each door being hinged to the skirt through lugs 38 (see Figure 4) and to an actuating rod 39 extending through a packing gland 40 in the reactor casing. As will be noted, the hinge connection between rods 39 and doors 37 is such that by pulling knobs 41 the doors may be opened a substantial distance. The number of doors shown by the drawings is not, of course, in any way critical, the drawings being merely illustrative.

In the operation of the reactor the level of catalyst maintained therein is determined by other operating factors, a high level being indicated in some instances, a relatively low level in others. Through proper manipulation of the trap doors the catalyst is easily kept at substantially any desired level.

The extension provided by the skirt 34 does not, of course, materially increase the reaction time regardless of the catalyst depth maintained but the more intimate contact between the oil vapors and catalyst brought about by the presence of the baffle elements 35 and the negligible premature loss of fresh catalyst to the stripping section materially increases cracking efficiency. The extension also enables more effective steam stripping of the catalyst before it is discharged via pipe 17 in that as a result thereof the catalyst in the stripping section is maintained at a lower level than heretofore and consequently under a lower pressure.

As is readily apparent other means such as various kinds of valves may be substituted for the trap doors 37. Figures 5 and 6 show a suitable plug type valve while Figures 7 and 8 illustrate one type of plate valve which may be used. In Figures 5 and 6 the threaded nut 42 through which passes complimentarily threaded valve stem 43, terminating in plug member 44 and having a turning knob 45, is mounted in fixed relation outside of and spaced from the reactor casing 15 through the agency of members 46 bolted or otherwise secured to the casing, leakage through which is prevented by packing gland 47.

Plate 48 in Figures 7 and 8, the functional equivalent of the member 44 in Figures 6 and 7, is fixedly secured via arms 49 to nut 50 embraced by members 51 which form a slide way in which rotation of the nut is prevented. Turning of the knob 52 on the threaded stem 53 passing through packing gland 54 causes lateral movement of the nut covering or uncovering the opening in the skirt as the case may be.

We claim:

1. In a vertically disposed cylindrical fluid catalyst cracking reactor having at its upper end a port for products discharge and at its lower end a port for spent catalyst discharge, the combination with a conduit for introduction of an oil vapor-catalyst mixture into a lower zone of the reactor, said conduit terminating in an upwardly enlarging, funnel-shaped portion within the reactor, the vertical axis of which corresponds essentially to the vertical axis of the reactor, and of a maximum diameter smaller than that of the reactor, a cylindrical skirt extending upwardly from the upper end of said funnel-shaped portion so constructed and arranged as to delineate an annular space within the reactor in open communication at its lower end with the catalyst discharge port, a plurality of series of passageways extending through the skirt at different elevations connecting the respective zones delineated by the skirt, closure means actuatable from without the reactor, adapted to the opening and closing of the respective passageways whereby the depth of the catalyst bed in the zone enclosed by the skirt may be regulated, and a plurality of vertically spaced grids extending transversely across the said zone at elevations intermediate the respective series of passageways.

2. The apparatus of claim 1 further characterized in that the closure means comprises a metal plate hinged at one end to the skirt and connected at its other end to an actuating rod adapted to be actuated from without the reactor.

3. The apparatus of claim 1 further characterized in that the closure means is of the plug valve type adapted to be moved radially to and from the respective passageways and actuated by a valve stem extending to without the reactor.

4. In a vertically disposed cylindrical reactor for cracking hydrocarbon vapors with the aid of a fluid type catalyst, having a products discharge port in the upper end thereof, a spent catalyst discharge port in the lower end thereof and a depending stripper communicating at its upper end with said discharge port, the combination with a conduit for introduction of an oil vapor-catalyst mixture into a lower zone of the reactor, said conduit terminating in an upwardly enlarging, funnel-shaped portion within the reactor, the vertical axis of which corresponds essentially to the vertical axis of the reactor and of a maximum diameter smaller than that of the reactor, a cylindrical skirt extending upwardly from the upper end of said funnel-shaped portion so constructed and arranged as to delineate an annular space within the reactor in open communication at its lower end with the catalyst discharge port, a plurality of series of passageways extending through the skirt at different elevations connecting the respective zones delineated by the skirt, closure means actuatable from without the reactor, adapted to the opening and closing of the respective passageways, whereby the depth of the catalyst bed in the zone enclosed by the skirt may be regulated, and a plurality of vertically spaced grids extending transversely across the said zone at elevations intermediate the respective series of passageways.

THOMAS B. KIMBALL.
ROBERT E. HOWE.

REFERENCES CITED

The following references are of record in the file of this patent:

UNITED STATES PATENTS

| Number | Name | Date |
|---|---|---|
| 2,378,542 | Edmister | June 19, 1945 |
| 2,415,755 | Ogorzaly et al. | Feb. 11, 1947 |
| 2,425,098 | Kassell | Aug. 5, 1947 |